(12) United States Patent
Hibi et al.

(10) Patent No.: US 8,169,650 B2
(45) Date of Patent: May 1, 2012

(54) PRINTING APPARATUS, METHOD, AND PROGRAM FOR SELECTING, DISPLAYING, AND PRINTING GROUP IMAGES

(75) Inventors: Makoto Hibi, Kawasaki (JP); Tetsuya Kawanabe, Yokohama (JP); Nobuyuki Tsukada, Kawasaki (JP); Tatsuya Fukuda, Machida (JP); Tomoaki Suga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1043 days.

(21) Appl. No.: 11/128,559

(22) Filed: May 13, 2005

(65) Prior Publication Data

US 2005/0270579 A1    Dec. 8, 2005

(30) Foreign Application Priority Data

May 14, 2004 (JP) ................................. 2004-145488
May 2, 2005 (JP) ................................. 2005-134526

(51) Int. Cl.
G06K 15/00 (2006.01)
G06F 3/12 (2006.01)
H04N 5/76 (2006.01)

(52) U.S. Cl. .................... 358/1.16; 358/1.15; 348/231.2; 348/231.5

(58) Field of Classification Search .................. 358/1.16
See application file for complete search history.

(56) References Cited

U.S. PATENT DOCUMENTS

| | | | |
|---|---|---|---|
| 2002/0140820 A1* | 10/2002 | Borden, IV | 348/207.99 |
| 2003/0063198 A1* | 4/2003 | Yokokawa | 348/231.2 |
| 2003/0081260 A1* | 5/2003 | Suzuki et al. | 358/302 |
| 2003/0154190 A1* | 8/2003 | Misawa et al. | 707/1 |
| 2003/0182297 A1* | 9/2003 | Murakami et al. | 707/100 |
| 2004/0078389 A1* | 4/2004 | Hamilton | 707/104.1 |
| 2004/0078751 A1* | 4/2004 | Kadoi et al. | 715/500 |
| 2005/0044066 A1* | 2/2005 | Hooper et al. | 707/3 |
| 2005/0055625 A1* | 3/2005 | Kloss | 715/500.1 |

FOREIGN PATENT DOCUMENTS

JP 11-7701 1/1999

* cited by examiner

*Primary Examiner* — Benny Q Tieu
*Assistant Examiner* — Fan Zhang
(74) *Attorney, Agent, or Firm* — Fitzpatrick, Cella, Harper & Scinto (57) ABSTRACT

According to this invention, the date range can be intuitively designated by designating up, down, left, and right directions, and images stored in a storage medium can be easily restricted to images which may be subjected to printing. In order to restrict images stored in a memory card on the basis of the date, a region for inputting the start date of the date range is displayed at the upper portion of a display window on a display device, and a region for inputting the end date is displayed at the lower portion. One of the regions is designated and selected with up and down direction keys. A date in the selected region is changed with left and right direction keys. Images having storage dates between the start date and the end date are decided as printing target candidates.

10 Claims, 13 Drawing Sheets

PRINTING PAPER SIZE: A4

PRINTING PAPER SIZE: L

| NUMBER OF IMAGES | LAYOUT PARAMETER | |
|---|---|---|
| N | P | Q |
| 1~4 | 2 | 2 |
| 5~9 | 3 | 3 |
| 10~12 | 4 | 3 |
| 13~16 | 4 | 4 |
| 17~20 | 5 | 4 |

PRINTING APPARATUS, METHOD, AND PROGRAM FOR SELECTING, DISPLAYING, AND PRINTING GROUP IMAGES

FIELD OF THE INVENTION

The present invention relates to a technique of displaying a desired image in a memory card for the purpose of a process such as printing.

BACKGROUND OF THE INVENTION

Digital cameras which convert an image as a photographing result into image data and store the image data in a storage medium such as a compact flash card have recently prevailed.

In general, an image printing system for printing by a printer an image taken by a digital camera uses a personal computer. The personal computer receives image data from a recording medium which records image data, converts the image data into print data printable by the printer, and outputs the print data to the printer.

Figure 9:
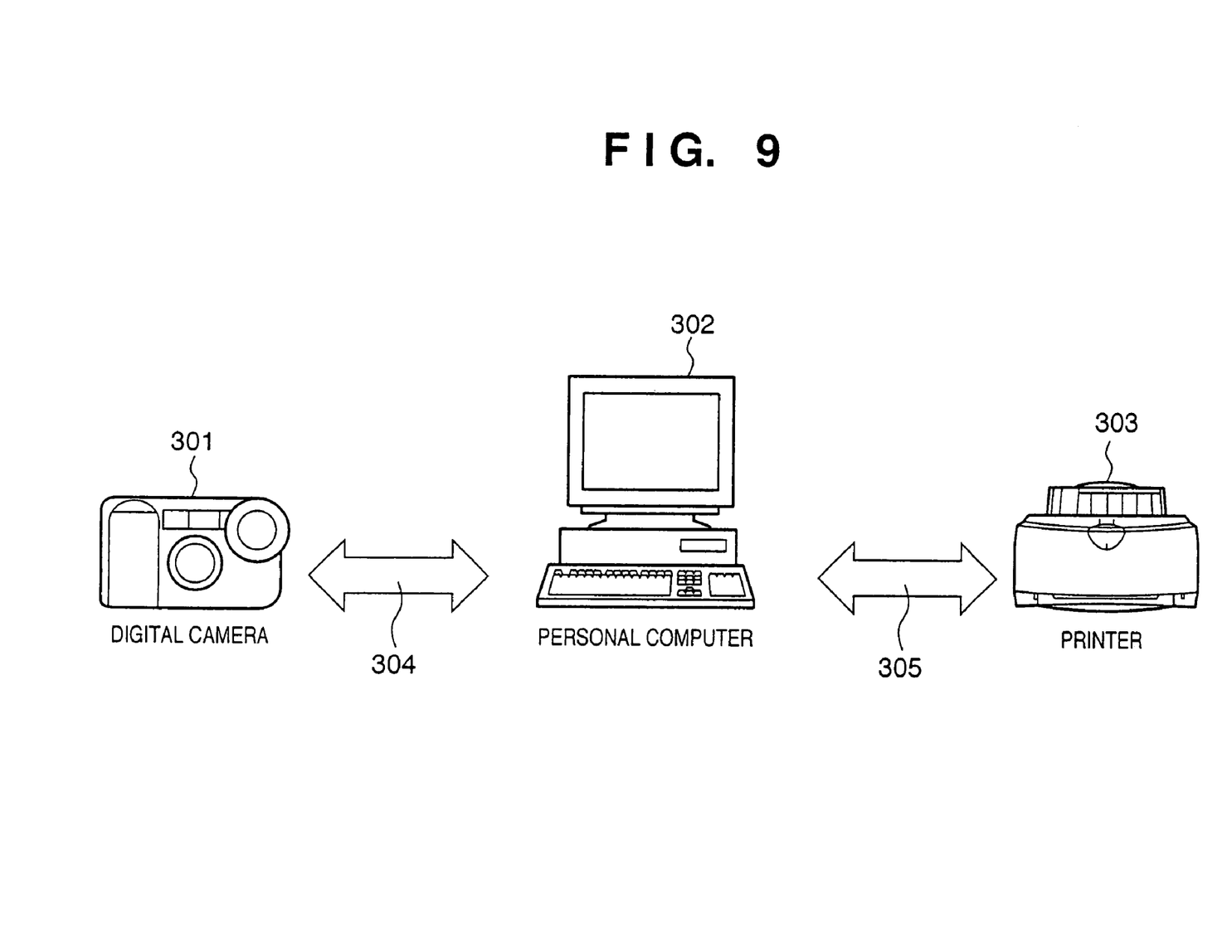
FIG. 9 is a view showing the configuration of a general printing system.

The image printing system will be explained in detail with reference to FIG. 9. FIG. 9 is a view showing an example of the configuration of a conventional image printing system.

As shown in FIG. 9, the image printing system comprises a digital camera 301, personal computer 302, and printer 303. The digital camera 301 and personal computer 302 are communicably connected to each other via a communication cable 304 such as RS232C or USB. The personal computer 302 and printer 303 are communicably connected to each other via a communication cable 305 such as Centronics or USB.

An image taken by the digital camera 301 is temporarily stored as image data in a compact flash card inserted in the digital camera 301. To record the taken image, the digital camera 301 and personal computer 302 are connected to each other by the communication cable 304, and communication software is activated in the personal computer 302. The communication software communicates with communication software in the digital camera 301, and image data stored in the compact flash card of the digital camera 301 is transmitted to the personal computer 302 via the communication cable 304. The image data is temporarily stored in, e.g., the hard disk of the personal computer 302.

As another general method, a card drive (not shown) for receiving a compact flash card or the like is connected to the personal computer 302, and the compact flash card removed from the digital camera 301 is inserted into the card drive to capture image data.

Generally, in order to print captured image data by the printer 303, an application in the personal computer 302 is activated to process the image data, and designates "print". Then, a printer driver for the printer 303 is activated, converts the image data into print data printable by the printer 303, and outputs the print data to the printer 303 via the communication cable 305. The printer 303 receives the print data via the communication cable 305, and prints and outputs an image represented by the print data on a printing paper sheet on the basis of the print data.

The above-described conventional image printing system requires operation and work in the personal computer 302 such as connection of the communication cable 304 for capturing image data from the digital camera 301 to the personal computer 302, activation of communication software, and activation of an application for converting captured image data into print data and outputting the print data. Operation of printing an image taken by the digital camera is time-consuming and cumbersome.

In this background, printers capable of receiving a storage medium such as a compact flash card have recently become available (e.g., Japanese Patent Laid-Open No. 11-7701). A printer of this type can print by an operation specialized in printing an image within a storage medium, and can print much more easily than the above system using a personal computer.

Most printers are equipped with a simple display (generally, a color liquid crystal display of about 2 inches) in order to print a desired image in a storage medium. In general, a sequence of operating the frame feed key or frame feedback key of the operation unit to display a target image, and pressing the print instruction switch is repeated until necessary images are printed.

Recent storage media represented by a compact flash card have achieved a large capacity, and can save several tens or in some cases several hundreds of image data within one card depending on the photographing mode (resolution or compression ratio) of the digital camera.

A target image is preferably displayed at the initial stage, but this case is rare, and many operations are apparently needed.

SUMMARY OF THE INVENTION

The present invention has been made to overcome the conventional drawbacks, and has as its object to provide a technique capable of searching for a target image by a simple operation.

In order to solve the above problem, a printing apparatus according to the present invention has the following arrangement.

That is, a printing apparatus which can access to a detachable storage medium, prints a desired image stored in the storage medium, and has image display output means comprises operation input means for inputting at least a date restriction instruction, an up/down/left/right direction instruction, and a decision instruction, display control means for, when the restriction instruction is input via the operation input means, outputting, to the image display output means, operation screen information for inputting a start date and an end date of a storage date range in order to designate the storage date range of image data stored in the connected storage medium, date range change means for changing target date information to preceding or succeeding date information by a left/right direction instruction input by deciding one of the start date and the end date as a change target in accordance with an up/down direction instruction input via the operation input means, and decision means for, when the decision instruction representing an end of changing the date range by the date range change means is input via the operation input means, deciding as a printing target selection candidate an image stored within the date range set by the date range change means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

A preferred embodiment according to the present invention will be described in detail below with reference to the accompanying drawings.

<Description of Apparatus Arrangement>

Figure 1:
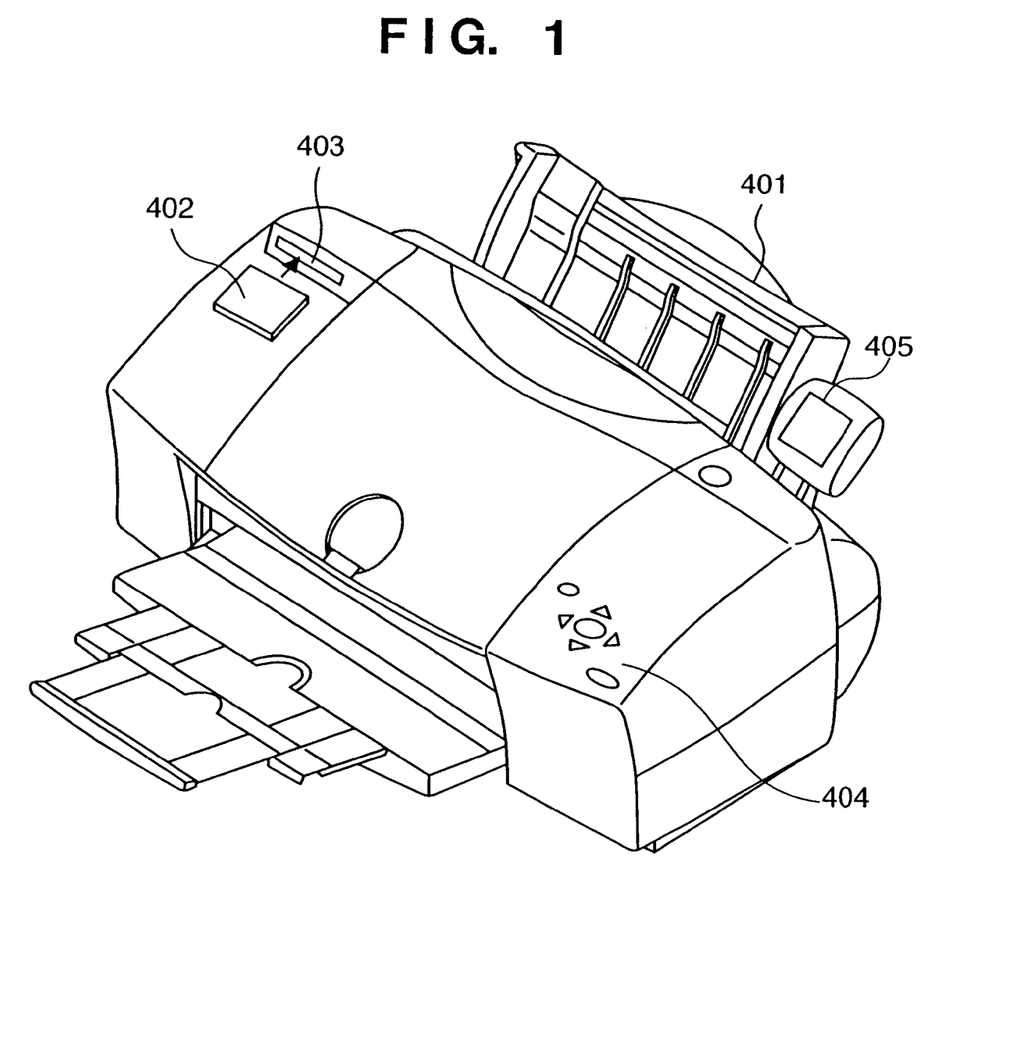
FIG. 1 is a perspective view showing the outer appearance of a printing apparatus according to an embodiment.
Figure 2:
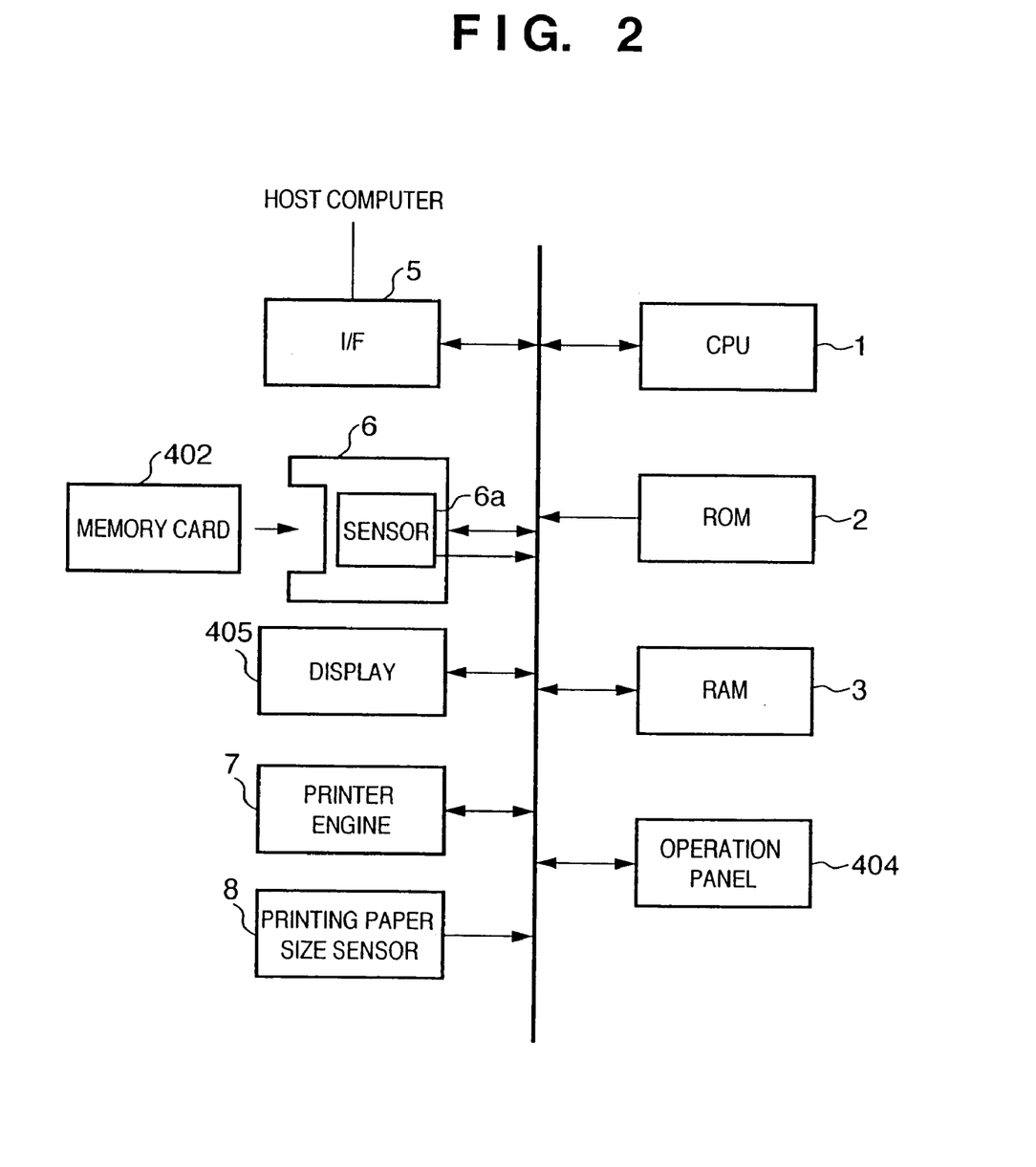
FIG. 2 is a block diagram showing the arrangement of the printing apparatus according to the embodiment.

FIG. 1 is a perspective view showing the outer appearance of a printing apparatus according to the embodiment, and FIG. 2 is a block diagram showing the arrangement of the printing apparatus.

In FIG. 1, reference numeral 401 denotes a printing apparatus main body according to the embodiment. The embodiment will exemplify a printer engine 7 which discharges ink droplets, but the present invention can be applied to any printer such as a thermal transfer printer (fusing type or sublimation type), dot printer, laser printer, or LED printer.

Reference numeral 405 denotes a display device which is a liquid crystal display (LCD) in the embodiment. The display device 405 is used to display various menu windows and an image to be printed. Reference numeral 404 denotes an operation panel having various keys to be operated by the user. While seeing a menu displayed on the display device 405 or the like, the user operates a key of the operation panel 404 to perform designation inputs such as a target image selection instruction, a print count instruction, a printing start instruction, and if necessary, designation of the printing mode and trimming region and a change of the printing position.

Reference numeral 402 denotes a memory card (storage medium) such as a compact flash® card; and 403, a storage medium slot which incorporates a connector 6 for electrically connecting a storage medium. The memory card 402 is inserted into the slot 403 and connected to the connector, and then a CPU 1 can access the memory card 402 (read image data or the like). The connector 6 has a sensor 6a for detecting connection of the memory card 402. A printing paper size sensor 8 detects the size of a printing paper sheet set in the apparatus, and is well known. For example, the printing paper size sensor 8 indirectly detects the paper size by detecting the type of feed cassette or detecting the position of a paper partition plate within the feed cassette.

The CPU 1 performs a series of print processes in accordance with a processing program stored in a ROM 2. The ROM 2 is used as a work area for the CPU 1. The rear surface of the printing apparatus main body 401 is equipped with an interface 5 for connecting a personal computer or the like.

Figure 3:
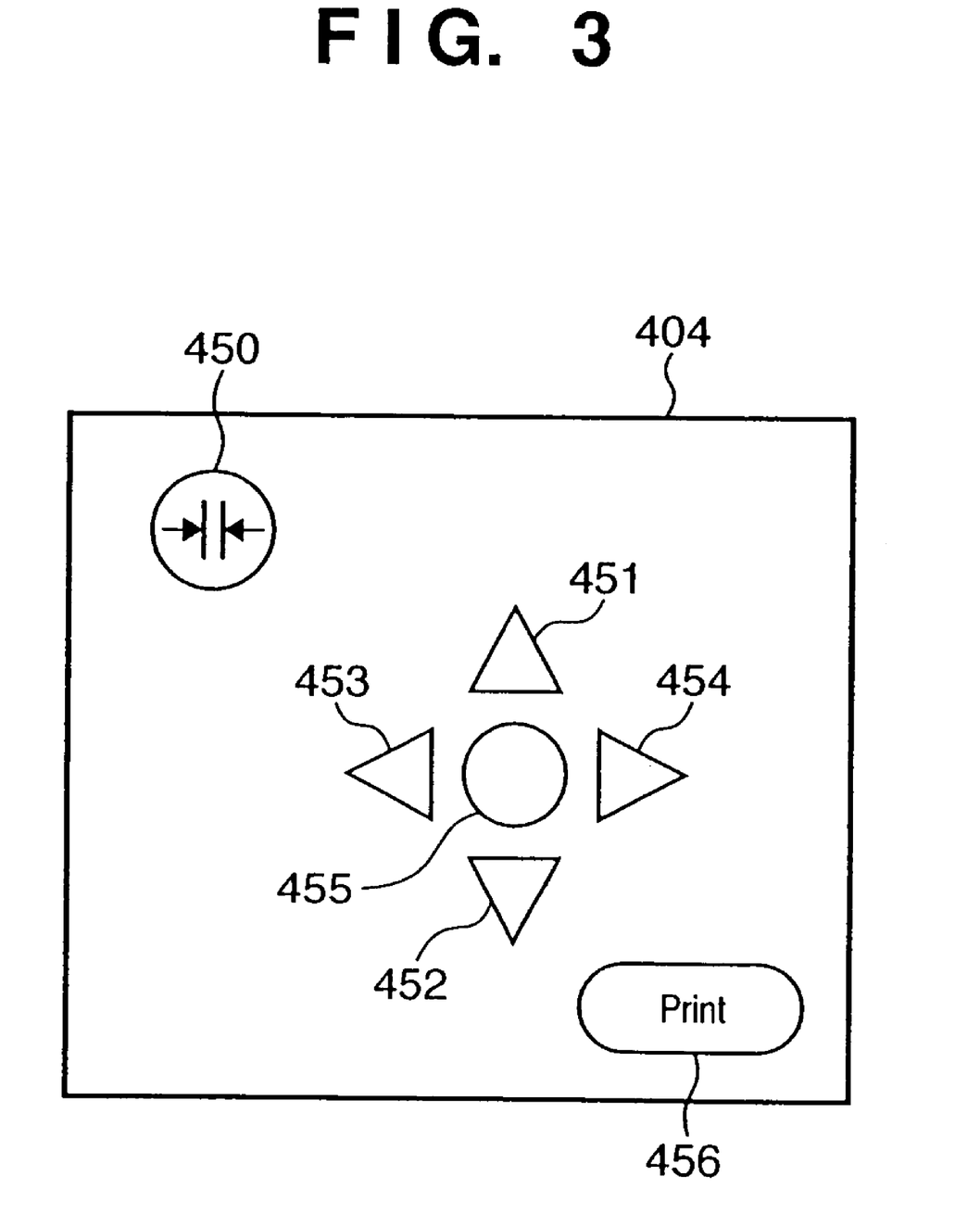
FIG. 3 is a view showing the switch layout of an operation panel according to the embodiment.

FIG. 3 shows the switch layout of the operation panel 404 according to the embodiment. Reference numeral 450 denotes a switch (to be referred to as a restriction switch hereinafter) which designates restriction(narrowing down); 451 to 454, switches (to be referred to as direction switches hereinafter) which designate up, down, left, and right directions; 455, a switch (to be referred to as a selection/OK switch hereinafter) which designates selection and decision; and 456, a switch (to be referred to as a print switch hereinafter) which designates printing. The direction switches 451 to 454 are also used to designate the number of prints and the coordinates of trimming, but these functions are irrelevant to the features of the present invention, and a description thereof will be omitted.

<Print Process of Image within Memory Card>

Figure 4:
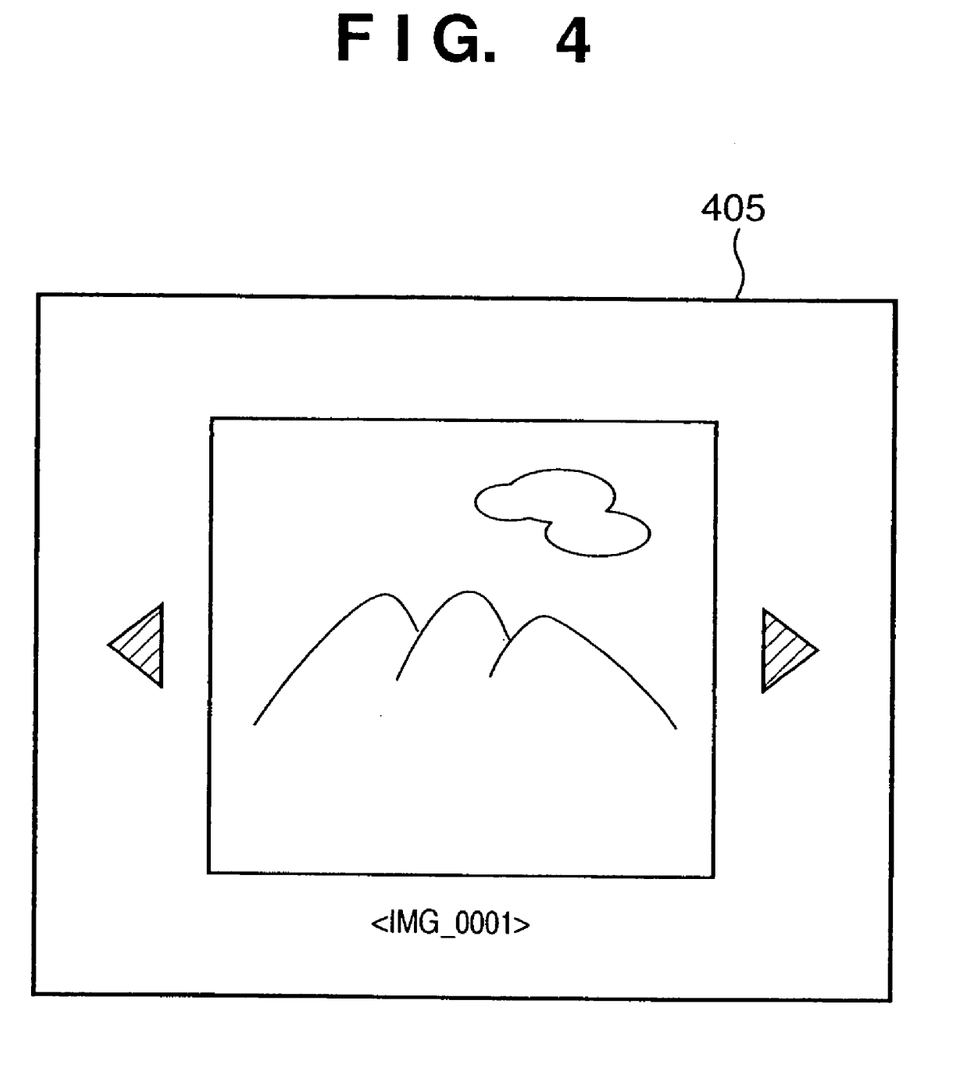
FIG. 4 is a view showing a printing target image selection operation window according to the embodiment.

FIG. 4 shows an example of the display of the display device 405 when the memory card 402 is inserted into the slot 403.

When the CPU 1 detects connection of the memory card 402, the CPU 1 creates an image file list for managing images in an order of photographing dates, and a date information list for managing photographing dates (years, months, and days except time) in an order of photographing dates in accordance with the photographing dates (dates of storage in the memory card 402) of image files stored in the memory card, details of which will be described later. At the initial stage when the memory card 402 is inserted into the slot, the oldest image (its reduced image) is displayed on the display device 405. The user operates the direction switches 453 and 454 to sequentially display images of the next and previous photographing dates, and when a target image is displayed, presses the selection/OK switch 455, and then presses the print switch 456 to print the image.

A file format which stores photographing date information in association with image data is, e.g., Exif. When the user presses the selection/OK switch 455, a menu for the number of prints and whether to or not to trim an image (defaults are the number of prints="1" and no trimming) is displayed. However, these functions are not the gist of the present invention, and a description thereof will be omitted.

By the above sequence, at least a target image can be printed. However, it can be easily analogized that the switches 453 and 454 must be pressed many times if many images are stored in the memory card 402.

To reduce the press count, the embodiment provides an environment which facilitates search for a target image by restricting the number of images to be displayed on the basis of the date when the restriction switch 450 is pressed in the window of FIG. 4.

The image file list and date information list according to the embodiment will be explained, and then a date-based restriction process will be explained.

<Description of Image File List and Date Information List>

When connection of the memory card 402 is detected by the sensor 6a, the CPU 1 creates an image file list and date information list in a RAM 3 in an order of the photographing dates of images stored in the file system of the memory card.

Figure 5:
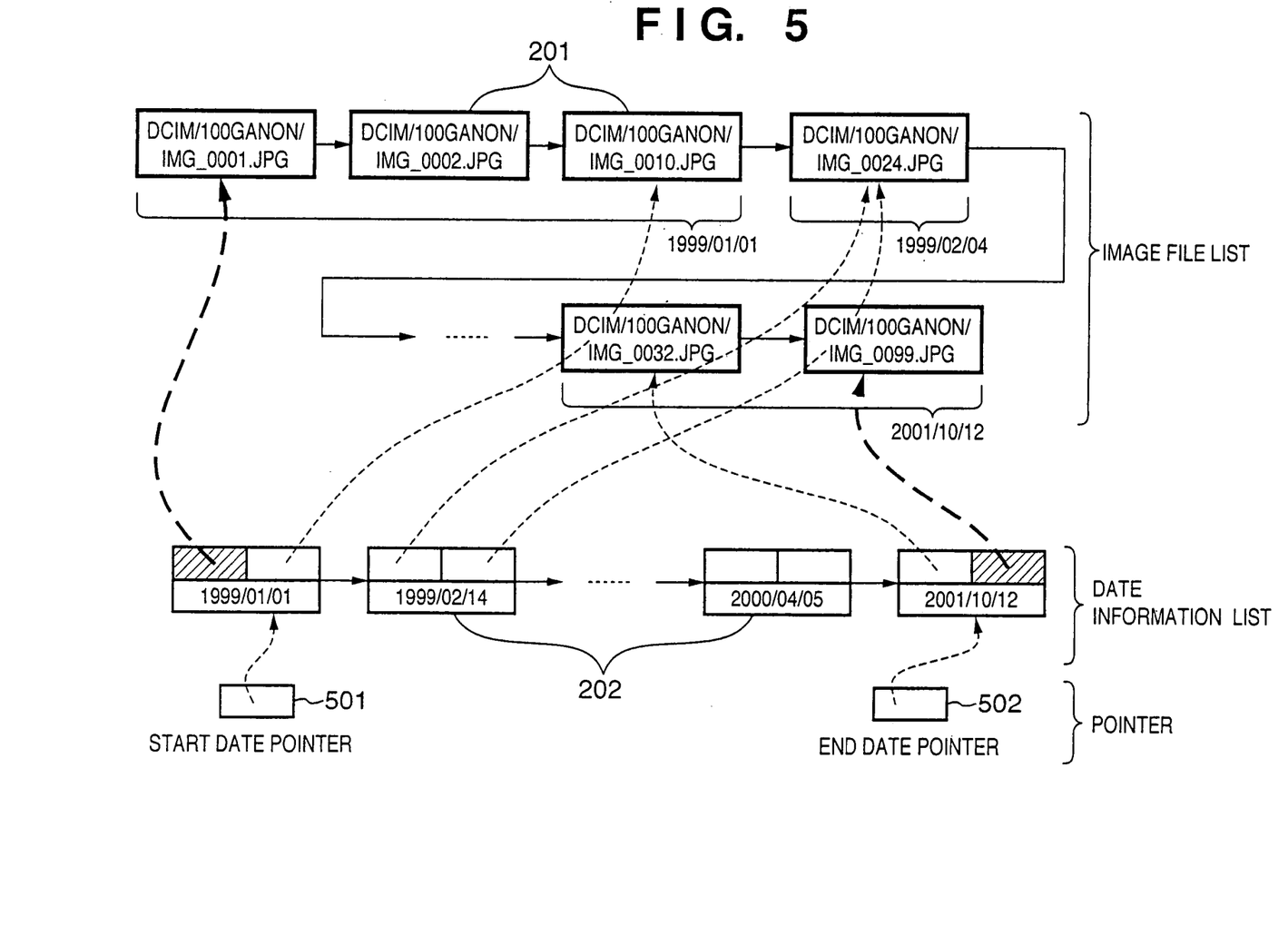
FIG. 5 is a view showing the structures of an image file list and date information list created by the printing apparatus and their relationship according to the embodiment.

FIG. 5 shows the structures of the image file list and date information list.

The image file list is formed from nodes 201 at which the paths and file names of image files in the file system of the memory card 402 are arranged in an order of photographing dates.

In FIG. 5, image files IMG_0001.JPG, IMG_0002.JPG, . . . exist in a folder having a path "DCIM/100GANON" in the memory card 402, and images have been taken in the order named.

The date information list manages images for each date except time (hour, minute, and second) in the embodiment. In other words, respective nodes 202 manage different dates. Each node in each date information list is formed from a field which stores information (identification information, and more simply the node number of an image file list) for specifying the nodes of the image file lists of the oldest and latest photographing times with the same photographing date, and a field which specifies the nodes of preceding and succeeding date information lists.

For example, in FIG. 5, the first three image files represent images taken on Jan. 1, 1999, and a corresponding node of the date information list stores information representing the first and third nodes in the image file list. When only one image is taken a day, the node of the date information list stores the same node identification information as that of the image file list.

Further, the embodiment generates two pointers: one is a start date pointer 501, and the other is an end date pointer 502. At the initial stage when the memory card 402 is inserted, the start date pointer 501 stores information for specifying the start node of the date information list, as shown in FIG. 5. The end date pointer 502 stores information for specifying the end node of the date information list.

The start date pointer 501 is used to specify the oldest image file managed by a corresponding node of the date information list, and the end date pointer 502 is used to specify the latest image file managed by a corresponding node of the date information list. At the initial stage when the memory card 402 is connected to the apparatus, the start date pointer 501 represents the oldest image file among all image files stored in the memory card 402, and the end date pointer 502 represents the latest image file among all image files in the memory card 402.

In the embodiment, when the start date pointer and end date pointer are determined and images to be printed are to be displayed, the first image within the range defined by the two pointers is displayed. When the user presses the direction switch 454, an image toward the latest one is displayed in accordance with the image file list. When the user presses the direction switch 453, an older image is displayed. That is, images exceeding the start date pointer 501 and end date pointer 502 cannot be designated. Images to be printed (printable) can be selected from only the range defined by the start date pointer 501 and end date pointer 502.

From the above description, at the initial stage when the memory card 402 is connected to the apparatus, the start date pointer 501 is set to the start node of the date information list, and the end date pointer 502 is set to the end node of the date information list. Immediately after the memory card 402 is connected to the apparatus, the oldest image stored in the memory card 402 is displayed, as shown in FIG. 4.

Figure 10:
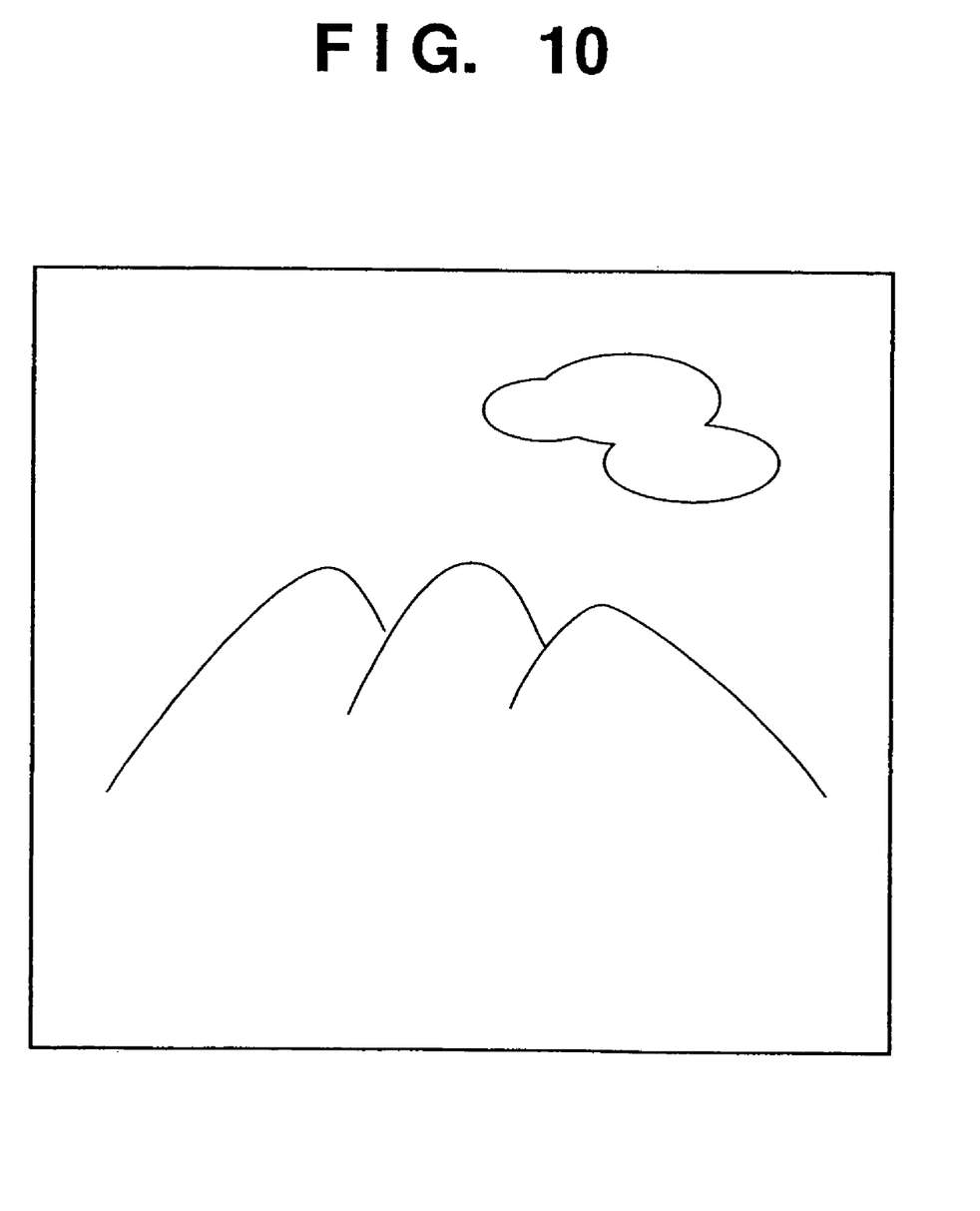
FIG. 10 is a view showing a result of general printing.
Figure 11:
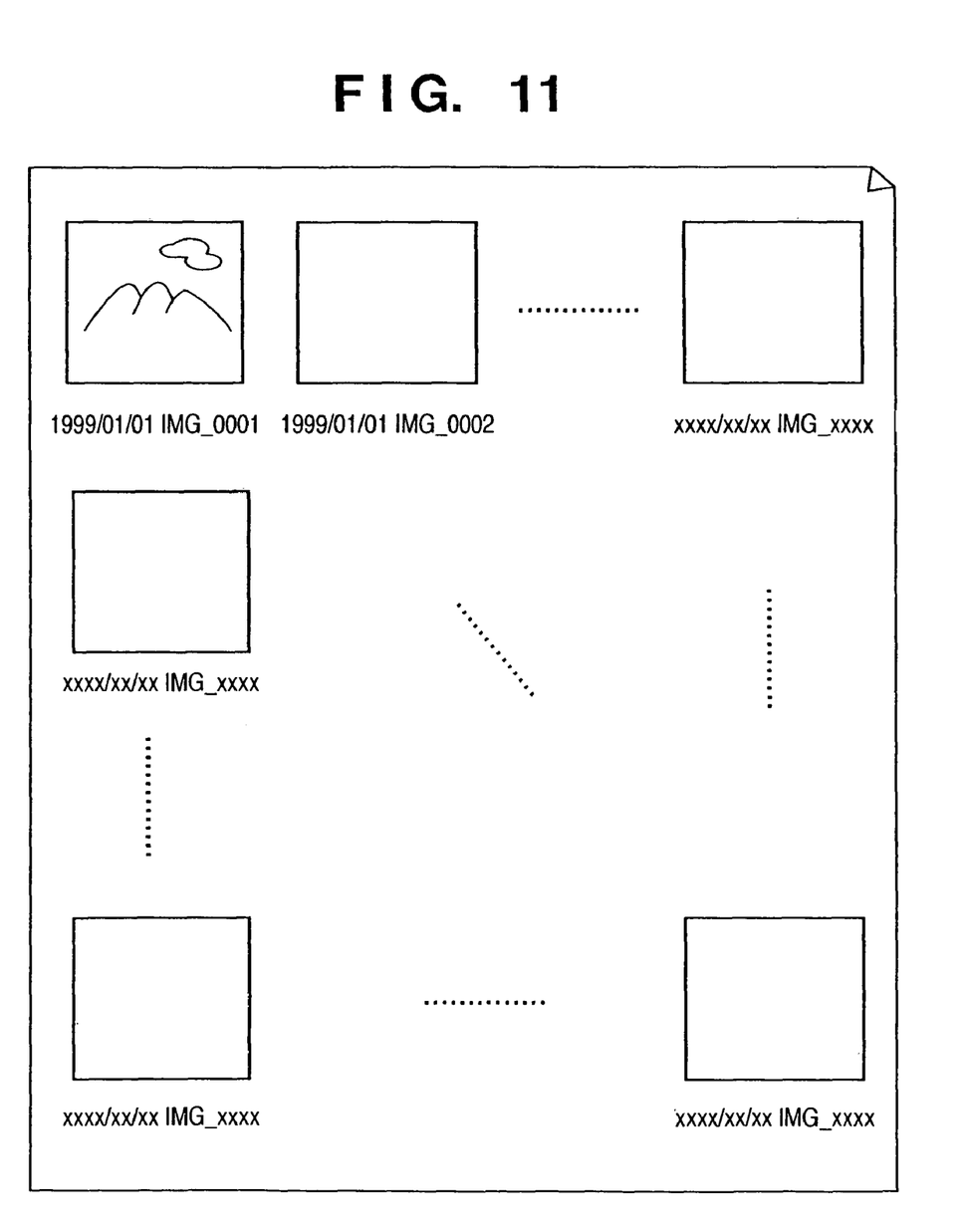
FIG. 11 is a view showing a result of index printing.

If the switches 453 and 454 are operated in this state, corresponding images are displayed in an order of the image file list in response to the operation. If the print switch 456 is pressed while a target image is displayed, a designated image is printed on one printing paper sheet (to be referred to as standard printing), as shown in FIG. 10.

A change of the start date pointer 501 will be examined.

Figure 6:
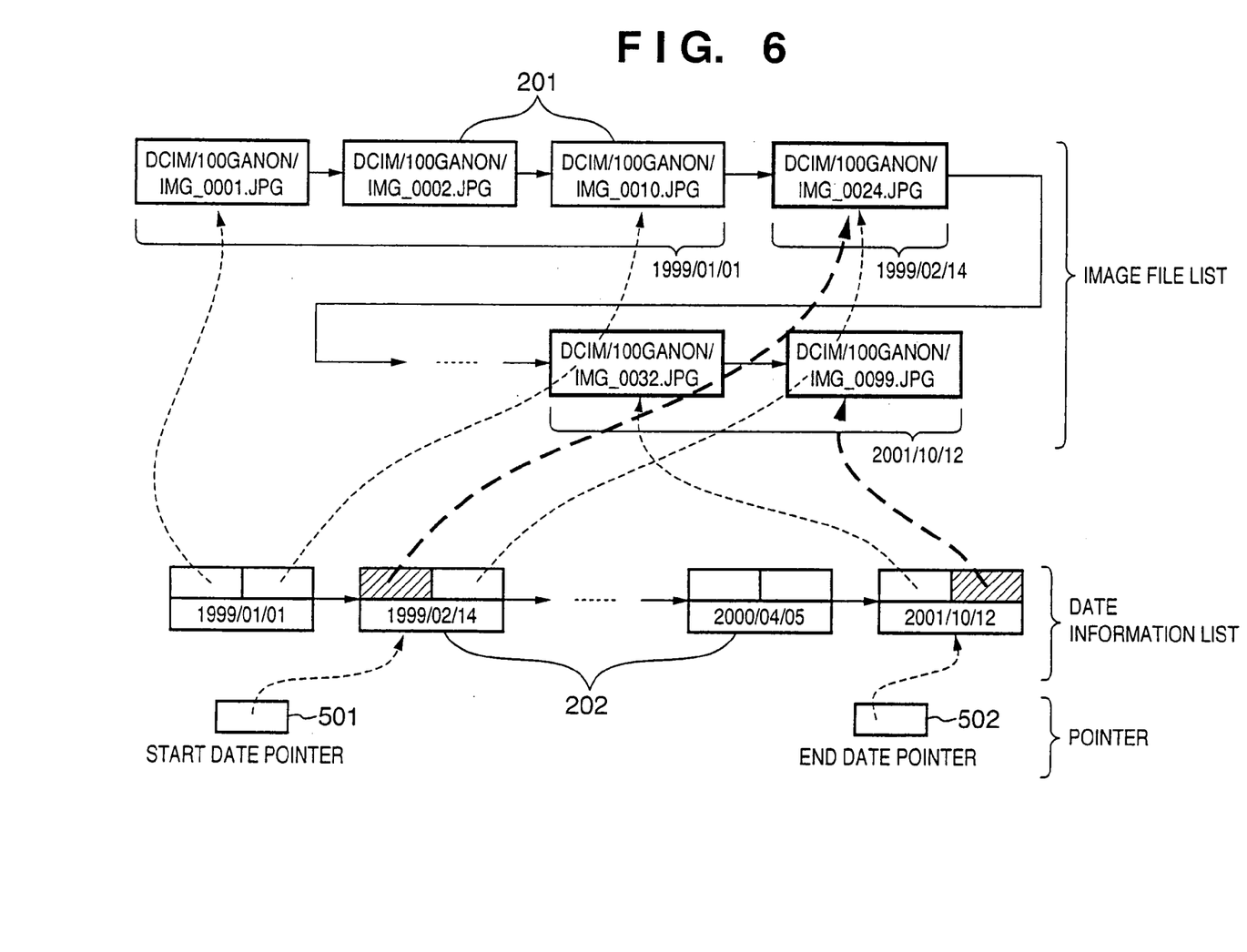
FIG. 6 is a view showing the relationship between the image file list and the date information list when the restriction start date is changed.

When the start date pointer 501 is so changed as to designate the second node of the date information list, the start date pointer 501 is changed to indicate a photographing date 1999/02/04, as shown in FIG. 5. The first image file taken on this date (in FIG. 5, "DCIM/100GANON/IMG_0024.JPG") is addressed as an image file. FIG. 6 shows this state.

More specifically, the start date pointer 501 represents the "1999/01/01" node of the date information list at the initial stage, and when display of images on the next photographing date is designated, moves not to the next date "1999/1/2" but to the photographing date "1999/02/14" of existing image files. In FIG. 6, therefore, the range from which the user can select print targets is from 1999/02/14 to 1999/10/12, and restriction functions effectively. For more easy understanding, a change of the start date pointer 501 by one is equivalent to a change of three image files in the image file list, as shown in FIG. 6. It will readily occur to those skilled in the art that the above description also applies to a case in which the end date pointer 502 is changed back in time. Note that the start date pointer 501 is inhibited from designating a node after a node of the date information list that is addressed by the end date pointer 502, and the end date pointer 502 is inhibited from designating a node of the date information list before the node of the start date pointer 501.

<Description of Restriction Process>

The start date pointer 501 and end date pointer 502 can be changed when the restriction switch 450 according to the embodiment is pressed. In the following description, it should be noted that the image file list and date information list have already been created.

Figure 7:
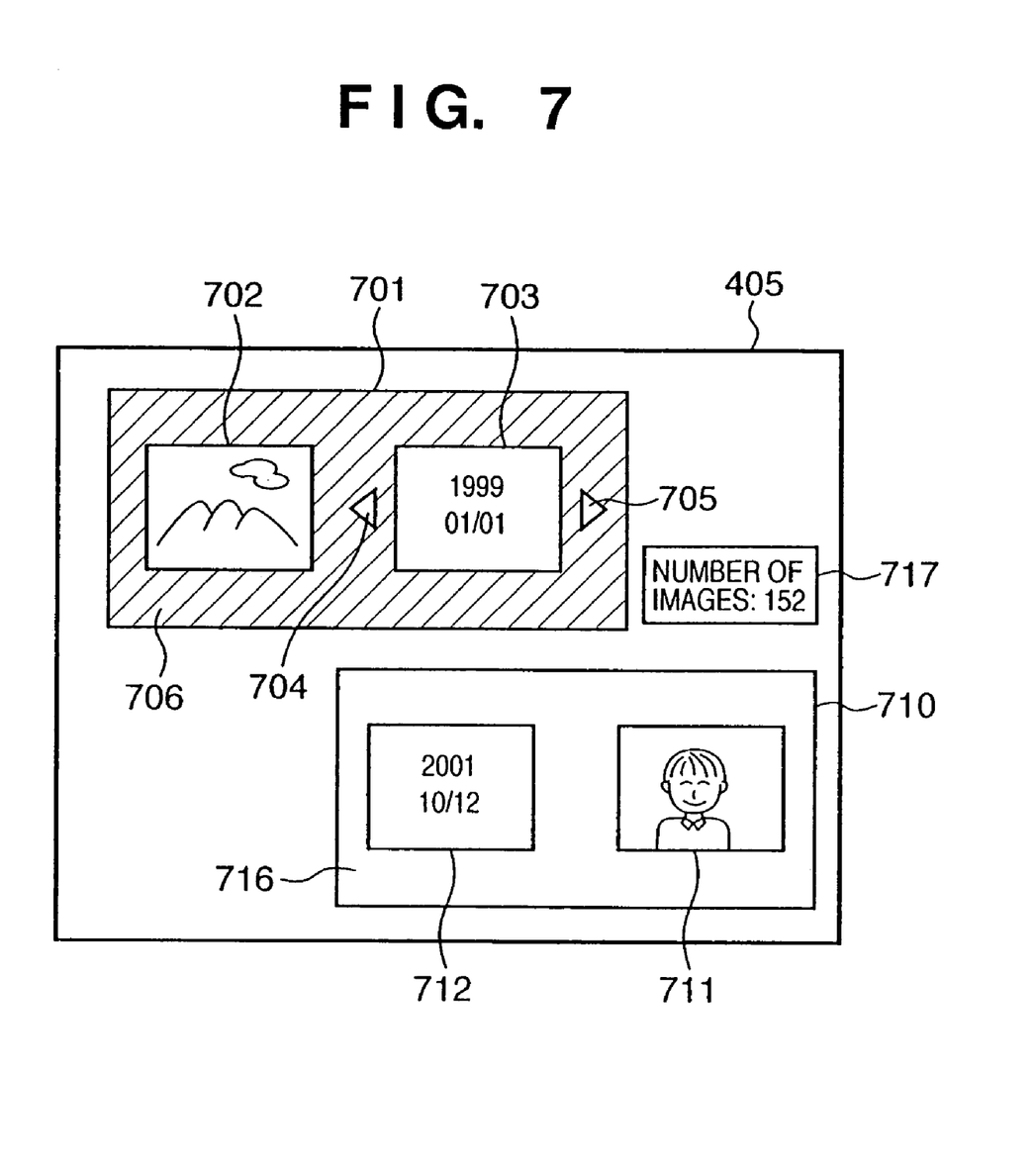
FIG. 7 is a view showing an example of a date restriction window according to the embodiment.

If the user presses the restriction switch 450 while the display device 405 is in the display state of FIG. 4, a window shown in FIG. 7 is displayed on the display device 405.

The display window displays a start date setting region 701 for designating a search start date and an end date setting region 710. The positional relationship between the two regions 701 and 710 corresponds to the relationship between the cross keys 451 and 452 of the operation panel 404. At the initial stage when the restriction switch 450 is pressed, the start date pointer 501 and end date pointer 502 are initialized to the oldest date information and latest date information of image files stored in the connected memory card 402.

At the initial stage, in order to represent that the start date setting region 701 can be changed, a background 706 is highlighted. Images are traced from the date information list indicated by the initialized start date pointer 501 to the image file list to display the oldest image (reduced image or thumbnail image) in a region 702. A date information display region 703 displays date information at the node of the date information list that is indicated by the start date pointer 501. In order to allow the user to intuitively recognize that the start date can be changed, marks 704 and 705 corresponding to the direction switches 453 and 454 are displayed. Since no image file before a displayed date exists at the initial stage, it is desirable to display the mark 704 in a form representing that the mark 704 is insignificant, or not to display the mark 704.

At the initial stage, the end date setting region 710 displays in a region 711 the last image of a date indicated by the initialized end date pointer 502, and displays the date of the last image in a region 712.

In providing this display, the number of image file lists (also the number of images) within the range defined by the start date pointer 501 and end date pointer 502 is counted, and the result is displayed in an image count display region 717. The number of images immediately after the restriction switch 450 is pressed coincides with the number of images stored in the memory card 402.

The reason that the start date setting region 701 is displayed at the upper portion of the display window and the end date setting region 710 is displayed at the lower portion of the display window is to prompt the user to intuitively make the regions 701 and 710 correspond to the direction switches 451 and 452. That is, if the direction switch 452 representing the down direction is pressed in the state of FIG. 7, highlighted display of the start date setting region 701 and display of the marks 704 and 705 are canceled, a background 716 of the end date setting region 710 is highlighted, and the marks 704 and 705 are displayed on the two sides of the region 712. Since no image file of a date after the end date at the initial stage exists, it is desirable to display the mark 705 in a form representing that the mark 705 is insignificant, or not to display the mark 705.

If the user touches the direction switch 705 in the display state of FIG. 7, the start date pointer 501 changes to indicate the next node of the date information list, and the regions 706 and 703 are updated on the basis of the change result. That is, if the direction switch 705 is touched at the initial stage of FIG. 7, the start date pointer 501 changes from the state of FIG. 5 to that of FIG. 6, the region 702 displays a reduced image (or thumbnail image) based on the image file "IMG_0024.JPG", and the region 703 displays a character string "Feb. 14, 1999". At this time, since the start date pointer 501 has changed, the number of images within the range defined by the changed start date pointer 501 and the end date pointer 502 is counted, and the result is displayed in the image count display region 717. When the direction switch 705 is touched again, the first image and date of the next photographing date of actual image files are displayed, and the image count display region 717 is also updated in accordance with this.

When the direction switch 452 is pressed to select the end date setting region 710 and the direction switches 453 and 454 are operated in the state of FIG. 7, the end date pointer 502 is updated, the region 711 displays the reduced image of the last image file of a date specified by the node of the date information file that is indicated by the updated end date pointer 502, and the region 712 displays this date. Also at this time, the number of images within the range defined by the start date pointer 501 and the updated end date pointer 502 is counted, and the result is displayed in the image count display region 717.

In this manner, the user sets start and end dates representing the search date range. It should be noted that when the start or end date is changed, the first or last image of the date is displayed, and the user can easily estimate a date range within which an image to be searched exists. When the direction switches 453 and 454 are operated, the regions 703 and 712 display only dates at which images exist, and the operation of instructing a change of the date can be minimized. Even if the start and end dates are the same, different images are displayed on the basis of time information (when two or more images are taken on the day), images within the date range can be analogized.

When it is detected that the user has pressed the selection/OK switch 455 in order to end setting of the start and end dates, the window returns to that of FIG. 4. At this time, since the start date pointer 501 and end date pointer 502 have been changed, an image displayed in the display region shown in FIG. 4 is an image displayed in the region 702 when the selection/OK switch 455 is pressed.

If it is detected that the user has pressed the print switch 456 in the state of FIG. 7, images (generally a plurality of images exist) within the range defined by the start date pointer 501 and end date pointer 502 at that time are printed by index printing. In the state of FIG. 7, 152 images undergo index printing. Index printing means a mode in which P×Q images are printed on one printing paper sheet. It should be noted that the number N of images to be actually printed is not always P×Q. When N is smaller than P×Q, a margin is printed by the difference. P and Q are determined in accordance with the printing paper size and the number of images subjected to index printing. The printing paper size is detected by the printing paper size sensor 8. The number of images subjected to index printing is the number of images within the range defined by the start date pointer 501 and end date pointer 502, as described above.

Figure 12:
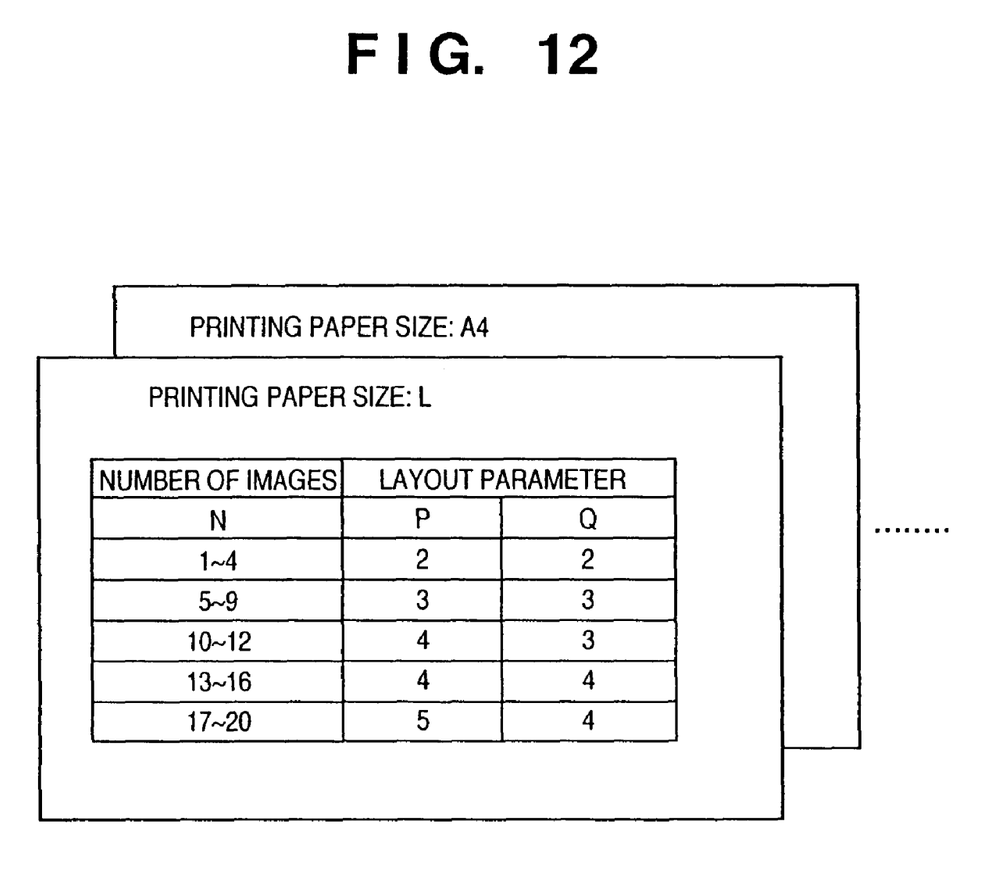
FIG. 12 is a view showing an example of a layout management table according to the embodiment.

In the embodiment, as shown in FIG. 12, the ROM 2 stores a table representing for each printing paper size the relationship between P, Q, and the number N of images to be printed on one printing paper sheet in index printing. P and Q are determined by referring to this table. The size (horizontal and vertical sizes) of one index image is calculated on the basis of the printing paper size and the determined P and Q values, but may also be managed by the table.

In index printing, the size of each image decreases as the number of images to be printed increases. If, however, the image size is too small, it is difficult for the user to confirm each image. Hence, the maximum P and Q values are determined in accordance with the printing paper size. Maximum P and Q values Pmax and Qmax are determined in accordance with the printing paper size (when the printing paper size is L, as shown in FIG. 12, Pmax=5 and Qmax=4). If the relationship with the number N of images subjected to index printing is "Pmax×Qmax≧N", the layout is determined in accordance with P and Q which are set in the table in correspondence with the number of images, and printing is performed.

For "Pmax×Qmax<N", index printing is done on a plurality of printing paper sheets with the Pmax×Qmax layout. In printing on the last printing paper sheet, the number of images to be printed on the last printing paper sheet is always Pmax×Qmax or less. In this case, P and Q may be obtained again to perform printing.

<Description of Process Sequence>

The printing apparatus according to the embodiment also performs a process based on print data received via the interface 5 from a personal computer or the like, but a description thereof is well known, is not the gist of the present invention, and will be omitted.

A process sequence executed when connection of the memory card 402 is detected by the sensor 6a will be explained. When the memory card 402 is connected while print data is received from the host computer to print, a message "Printing is in progress, and please wait for a while" or the like is displayed on the display device 405, and after printing is completed, the following process is executed.

Figure 8:
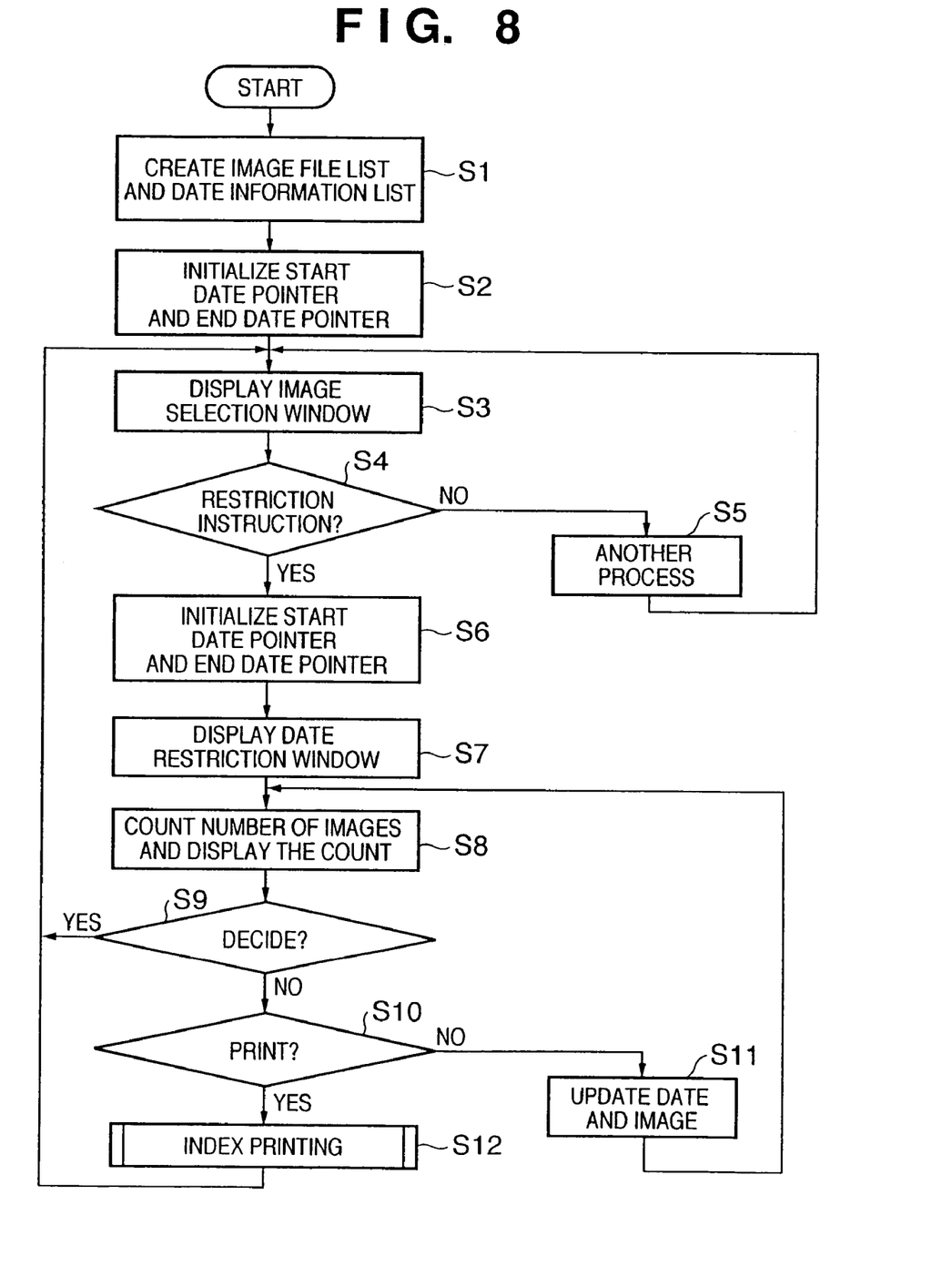
FIG. 8 is a flowchart showing a process sequence which starts when a memory card is connected to the printing apparatus according to the embodiment.

FIG. 8 is a flowchart showing the process sequence when the memory card 402 is connected (corresponding program is stored in the ROM 2). The process sequence will be explained with reference to FIG. 8.

In step S1, the connected memory card 402 is accessed, and an image file list and date information list are created in accordance with photographed image file names stored in the memory card 402 and the photographing date information. In step S2, the start date pointer 501 is so set as to address the start node of the date information list, and the end date pointer 502 is so initialized as to address the end node of the date information list.

In step S3, the image selection window is displayed, as shown in FIG. 4. When this window is displayed for the first time, the first image of a date represented by the node of the date information list that is indicated by the start date pointer 501 is displayed. If the flow shifts from step S2 to step S3, this means that the oldest image stored in the memory card 402 is displayed. An image displayed in step S3 may be the latest sensed image indicated by the end date pointer 502.

In step S4, it is determined whether the restriction switch 450 of the operation panel 404 has been pressed. If a switch other than the restriction switch 450 is pressed, the flow advances to step S5 to perform a corresponding process. For example, if the switch 454 is pressed, the image file of an image sensed next to the displayed image is acquired from the image file list to display the acquired image. If the selection/OK switch 455 is pressed, a printing condition window is displayed, and if the print switch 456 is pressed, a selected image is printed.

If the restriction switch 450 is determined to have been pressed, the flow advances to step S6 to set the start date pointer 501 so as to indicate the start node of the date information list and the end date pointer 502 so as to indicate the end node of the date information list. In other words, the same process as that in step S2 is executed.

The flow advances to step S7 to display the default date restriction window shown in FIG. 7.

The flow advances to step S8 to count the number of nodes within the range defined by the start date pointer 501 and end date pointer 502 at that time, and display the count in the image count display region 717 of FIG. 7.

In step S9, it is determined whether the user has pressed the selection/OK switch 455. If it is determined that a switch other than the selection/OK switch 455 has been pressed, the flow advances to step S10 to determine whether the print switch 456 has been pressed. If NO in step S10 (one of the cross keys 451 to 454 is determined to have been pressed), the restriction start and end dates are updated (the start date pointer 501 and end date pointer 502 are also updated), and an image at that time is updated in step S11. The flow then returns to step S8 to count the number of images within the selected range and update the image count display region 717.

In the above description, the processes in steps S1 and S2 are triggered by detecting that the memory card has been connected, but may be triggered by a restriction instruction. In this case, the list creation process does not start upon inserting (connecting) the memory card, and the apparatus can quickly shift to image selection operation.

If the selection/OK switch 455 is determined in step S9 to have been pressed, the flow returns to step S3 to return to the display state of FIG. 4 and display an image corresponding to the start date pointer 501.

If the print switch 456 is determined in step S10 to have been pressed, the flow advances to step S12 to perform index printing for images which fall within the range defined by the start date pointer 501 and end date pointer 502 and correspond to a count displayed in the image count display region 717.

As described above, according to the embodiment, when restriction is designated, a date range to be restricted can be determined on the basis of the photographing dates of image files stored in a connected storage medium such as a memory card, and many images can be easily searched for a target image. The start and end dates of a range displayed on the default restriction window are the oldest and latest dates among the actual photographing dates of image files stored in the storage medium. As dates for determining the range, no date other than actual photographing dates are displayed, decreasing the number of date input operations.

The above embodiment has exemplified restriction based on the date, but images may be restricted including "photographing conditions" recorded at the Exif tag, or a plurality of restriction conditions may be combined by the "and" or "or" condition.

In the above embodiment, the user inputs an instruction via the switch. However, the display device may be formed from a touch panel, and the instruction input means is not limited to the above embodiment.

The above embodiment has exemplified a memory card as the storage medium, but the storage medium is not limited to the memory card as far as an image is loaded from a storage medium capable of storing an image.

Figure 13:
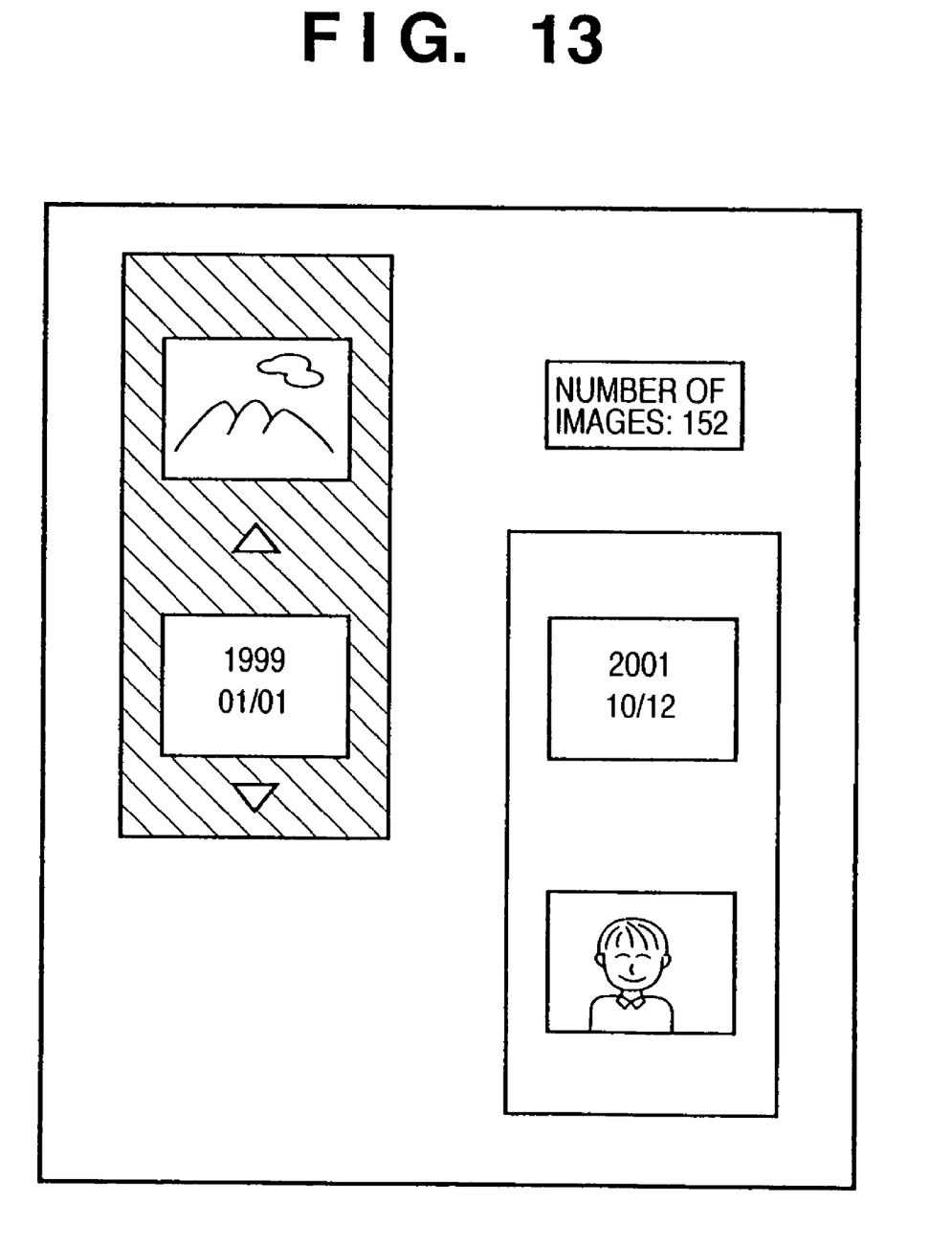
FIG. 13 is a view showing an example of a date restriction window according to another embodiment.

Moreover, according to above description, the up/down keys identify the refined switching between the start date and the end date and the right/left keys identify the date change of the start date or the end date as show in FIG. 7. The function assignation of the left/right keys and the up/down keys can be exchanged as desired. That is, the up/down keys may identify the date change of the start date or the last date, while the right/left keys may identify the refined switching between the start date and the end date. In this case, the system would benefit from a screen orientation change, where FIG. 7's limited screen could be changed to look as the screen shown by FIG. 13.

Moreover, even if the previous descriptions considered a memory card directly mounted on a printer, this system also applies in the case of a printer connecting to a memory device considered to be an external part relative to the printer. Also, regarding the connection between the printer and an external memory medium, it is not only limited to USB type wired connections but both devices could also connect via a wireless medium.

Furthermore, in the embodiments, even if it is explained that "day" constitutes the smallest discriminating unit, the displayed information also specifies the hours, minutes and seconds. Therefore, it is possible to print images according to the following indexing namely, 9 am on that day to 3 pm on the same day.

In the above embodiment, the display device 405 is provided to the printing apparatus. The printing apparatus may comprise a display output terminal to connect an external monitor device (e.g., a television apparatus). That is, the printing apparatus is not limited to the above embodiment as far as data is output to a display output means serving as a display device such as a liquid crystal display.

As has been described above, according to the present invention, the date range can be intuitively designated by designating up, down, left, and right directions. In addition, images stored in a storage medium can be easily restricted to images which may be subjected to printing.

According to another invention, in designating the date range, the date range can be set by the actual storage dates of images stored in a storage medium. The date range can be efficiently set, and images can be restricted to ones which may be subjected to printing.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priorities from Japanese Patent Application Nos. 2004-145488 filed on May 14, 2004 and 2005-134526 filed on May 2, 2005, which are hereby incorporated by reference herein.

What is claimed is:

1. An image processing apparatus, comprising:
    a classifying unit configured to classify a plurality of images stored in a memory into a plurality of groups, according to attribute information of each of the plurality of images, each of the plurality of groups including at least one image;
    a generating unit configured to generate group information which indicates each of the plurality of groups classified by the classifying unit and an order of the plurality of groups, according to the attribute information;
    a first display control unit configured to cause a display apparatus to display an image selection window, the image selection window including;
        a start date setting region for designating a search start date and an image from a leading group of the plurality of groups corresponding to the search start date; and
        an end date setting region for indicating an end date and an image from a last group of the plurality of groups corresponding to the end date;
    a selecting unit configured to, in accordance with an instruction by a user using the image selection window, individually select each of the leading group and the last group among the plurality of groups indicated by the group information generated by the generating unit;
    a counting unit configured to, when both of the leading group and the last group are selected by the selecting unit, specify the groups from the leading group to the last group in the order indicated by the group information and to count a total number of images included in the specified groups; and
    a second display control unit configured to cause the display apparatus to display the total number counted by the counting unit in an image count display region of the image selection window.

2. The apparatus according to claim 1, wherein the classifying unit classifies, for the attribute information, the plurality of images into the plurality of groups based on a predetermined order of the images, where the predetermined order depends upon the attribute information of each of the plurality of images.

3. The apparatus according to claim 2, the display control unit causes the display apparatus to further display a leading image at the top in the predetermined order among images included in the leading group and a last image at the last in the predetermined order among images includes in the last group.

4. The apparatus according to claim 3, wherein the display control unit causes the display apparatus to display both of the leading image and the last image within areas respectively different from each other on a display screen of the display apparatus.

5. The apparatus according to claim 1, further comprising a print control unit configured to, according to an instruction by a user, cause a printing apparatus to print images included in groups from the leading group to the last groups in the order determined by the determining unit.

6. The apparatus according to claim 1, wherein the classifying unit classifies the plurality of images stored in the memory, according to a photographing date of each of the images.

7. The apparatus according to claim 1, wherein the display control unit caused the display apparatus to display, on a screen, both of information indicating a group selected from the plurality of groups and the total number of images included in the specified groups.

8. The apparatus according to claim 1, wherein the selecting unit selects one of the leading group and the last group alternately in response to the user's instruction.

9. An image processing method, comprising:
    classifying a plurality of images stored in a memory into a plurality of groups, according to attribute information of each of the plurality of images, each of the plurality of groups including at least one image;
    generating group information which indicates each of the plurality of classified groups and an order of the plurality of classified groups according to the attribute information;
    causing a display apparatus to display an image selection window, the image selection window including;
        a start date setting region for designating a search start date and an image from a leading group of the plurality of groups corresponding to the search start date; and
        an end date setting region for indicating an end date and an image from a last group of the plurality of groups corresponding to the end date;
    selecting, in accordance with an instruction by a user using the image selection window, each of the leading group and the last group individually among the plurality of the classified groups indicated by the generated group information;
    specifying the groups from the leading group to the last group in the order indicated by the group information when both of the leading group and the last group are selected;
    counting a total number of images included in the specified groups; and
    causing the display apparatus to display the counted total number in an image count display region of the image selection window.

10. A non-transitory memory medium for storing a program causing a computer to execute the image processing method according to claim 9.

* * * * *